United States Patent
Yoshizawa (10) Patent No.: US 12,235,648 B2
(45) Date of Patent: Feb. 25, 2025

(54) TRANSPORT MANAGEMENT SYSTEM, TRANSPORT MANAGEMENT METHOD, AND PROGRAM

(71) Applicant: TOYOTA JIDOSHA KABUSHIKI KAISHA, Toyota (JP)

(72) Inventor: Shintaro Yoshizawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 283 days.

(21) Appl. No.: 17/652,211

(22) Filed: Feb. 23, 2022

(65) Prior Publication Data

US 2022/0283585 A1   Sep. 8, 2022

(30) Foreign Application Priority Data

Mar. 4, 2021   (JP) .................................. 2021-034264

(51) Int. Cl.
   *G05D 1/00*   (2024.01)
(52) U.S. Cl.
   CPC ......... *G05D 1/0217* (2013.01); *G05D 1/0278* (2013.01); *G05D 1/0287* (2013.01)
(58) Field of Classification Search
   CPC .. G05D 1/0217; G05D 1/0278; G05D 1/0287; G05D 1/0297; G06Q 10/083; G06Q 10/047; G06Q 10/06313; G06Q 10/08355
   See application file for complete search history.

(56) References Cited

U.S. PATENT DOCUMENTS

| | | | |
|---|---|---|---|
| 2020/0143319 A1* | 5/2020 | Fu | G06N 5/01 |
| 2021/0103891 A1* | 4/2021 | Fu | G06F 18/231 |
| 2023/0111516 A1* | 4/2023 | Liu | G05D 1/0297 |
| | | | 701/119 |

FOREIGN PATENT DOCUMENTS

| | | |
|---|---|---|
| CN | 112183932 A | 1/2021 |
| JP | 2020083554 A | 6/2020 |

\* cited by examiner

*Primary Examiner* — Erin M Piateski
*Assistant Examiner* — Brian E Yang
(74) *Attorney, Agent, or Firm* — SoraIP, Inc.

(57) ABSTRACT

A transport management system includes: a reception section that receives p transport task information pieces indicating transport tasks, each of which has a point of origin and a point of destination; a linkage section that generates q (q<p) linked-tasks information pieces by linking the p transport task information pieces; and an assignment section that assigns the q linked-tasks information pieces to q transport robots, respectively. The linkage section generates the q linked-tasks information pieces such that a total travel distance becomes shorter, the total travel distance being the sum of travel distances of the q transport robots, the travel distances being required for the q transport robots to carry out the q linked-tasks information pieces, respectively.

6 Claims, 10 Drawing Sheets

TRANSPORT MANAGEMENT SYSTEM, TRANSPORT MANAGEMENT METHOD, AND PROGRAM

CROSS-REFERENCE TO RELATED APPLICATION

This application claims priority to Japanese Patent Application No. 2021-034264 filed on Mar. 4, 2021, incorporated herein by reference in its entirety.

BACKGROUND

1. Technical Field

The disclosure relates to a transport management system, a transport management method, and a program.

2. Description of Related Art

Japanese Unexamined Patent Application Publication No. 2020-83554 provides a technology in which when a plurality of transport-target objects with different loading points and different unloading points are transported, the loading points of the plurality of transport-target objects are visited around to load the plurality of transport-target objects in order, a predetermined distance is traveled, and then the unloading points of the plurality of transport-target objects are visited around to unload the plurality of transport-target objects in order, whereby a time period required for transport tasks is shortened.

Moreover, JP 2020-83554 A discloses that when a new transport task is received while a plurality of transport moving apparatuses are carrying out transport tasks, a transport moving apparatus is identified that can arrive earliest at a loading point for the new transport task after the transport moving apparatus completes a transport task currently carried out, and the identified transport moving apparatus is caused to carry out the new transport task.

SUMMARY

However, there remains a room for improvement in JP 2020-83554 A described above, in terms of transport efficiency.

An object of the disclosure is to provide a technology that improves transport efficiency when a plurality of transport tasks are carried out.

According to a first aspect of the disclosure of the present application, a transport management system is provided that includes: a reception section that receives p transport task information pieces indicating transport tasks, each of which has a point of origin and a point of destination; a linkage section that generates q (q<p) linked-tasks information pieces by linking the p transport task information pieces; and an assignment section that assigns the q linked-tasks information pieces to q transport moving apparatuses, respectively, wherein the linkage section generates the q linked-tasks information pieces such that a total travel distance becomes shorter, the total travel distance being the sum of travel distances of the q transport moving apparatuses, the travel distances being required for the q transport moving apparatuses to carry out the q linked-tasks information pieces, respectively. According to such a configuration, transport efficiency can be improved when a plurality of transport tasks are carried out. Preferably, the linkage section calculates an inter-task travel distance made when two different transport task information pieces of the p transport task information pieces are linked in a sequence, and preferentially links two transport task information pieces that make the shortest inter-task travel distance. According to such a configuration, transport efficiency can be further improved when a plurality of transport tasks are carried out. Preferably, when an inter-task travel distance made when a linked-tasks information piece including at least two transport task information pieces is linked with another transport task information piece is not equal to or less than a predetermined value, the linkage section does not link the linked-tasks information piece with the other transport task information piece. According to such a configuration, it is possible to prevent all transport task information pieces from being linked into a single linked-tasks information piece. Preferably, a current position information acquisition section that acquires current position information on each of the q transport moving apparatuses is further included, and the assignment section assigns the q linked-tasks information pieces to the q transport moving apparatuses, respectively, based on the point of origin of the beginning transport task information piece of each linked-tasks information piece, and the current position of each transport moving apparatus. According to such a configuration, transport efficiency can be further improved. Preferably, when the reception section receives a new transport task information piece while the q transport moving apparatuses are carrying out the q linked-tasks information pieces, respectively, the linkage section generates q linked-tasks information pieces by relinking anew transport task information pieces yet to be carried out, and when the q transport moving apparatuses complete respective transport task information pieces currently carried out, the assignment section assigns the q linked-tasks information pieces that are relinked anew to the q transport moving apparatuses, respectively. According to such a configuration, a newly received transport task information piece can be taken in without any difficulty. Preferably, the linkage section links the p transport task information pieces such that a difference between the travel distances of the q transport moving apparatuses becomes smaller, the travel distances being required for the q transport moving apparatuses to carry out the q linked-tasks information pieces, respectively. According to such a configuration, unevenness of loads on the transport moving apparatuses can be restrained. According to a second aspect of the disclosure of the present application, a transport management method is provided that includes: receiving p transport task information pieces indicating transport tasks, each of which has a point of origin and a point of destination; generating q (q<p) linked-tasks information pieces by linking the p transport task information pieces; and assigning the q linked-tasks information pieces to q transport moving apparatuses, respectively, wherein the generating the q linked-tasks information pieces is to generate the q linked-tasks information pieces such that a total travel distance becomes shorter, the total travel distance being the sum of travel distances of the q transport moving apparatuses, the travel distances being required for the q transport moving apparatuses to carry out the q linked-tasks information pieces, respectively. According to such a method, transport efficiency can be improved when a plurality of transport tasks are carried out. A program causing a computer to execute the transport management method is provided.

According to the disclosure, transport efficiency can be improved when a plurality of transport tasks are carried out.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the disclosure will be described with reference to the drawings.

Figure 1:
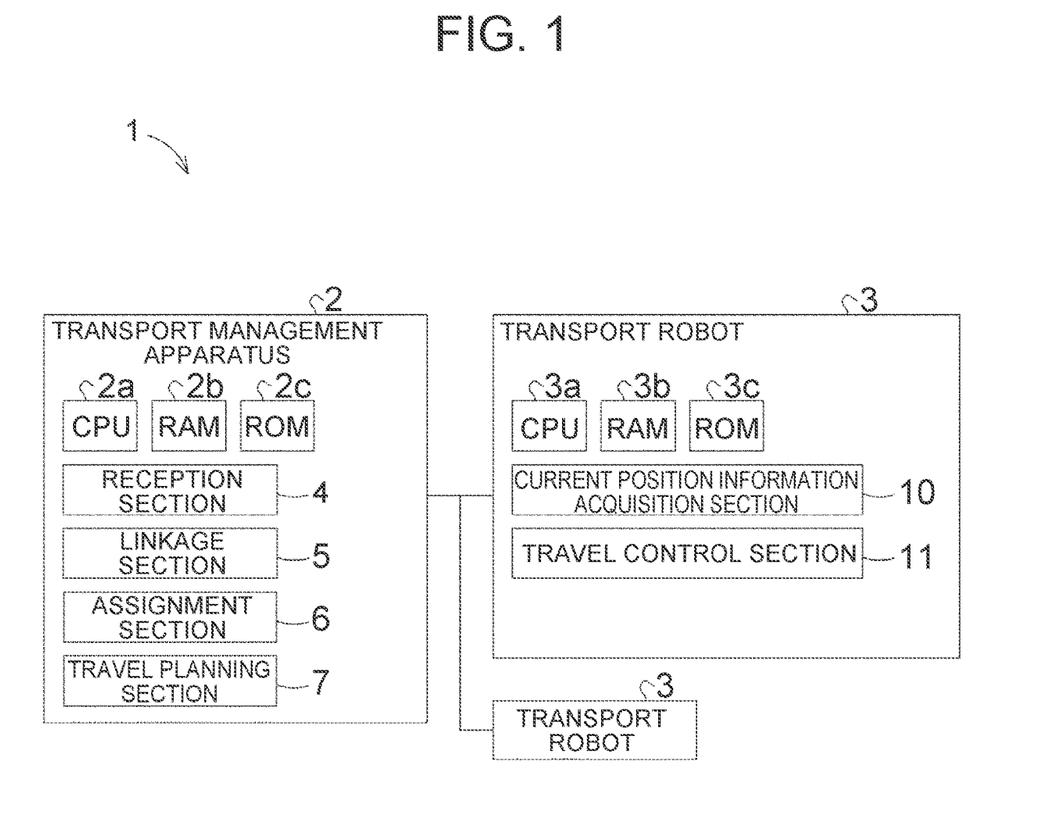
FIG. 1 is a functional block diagram of a transport system.
Figure 2:
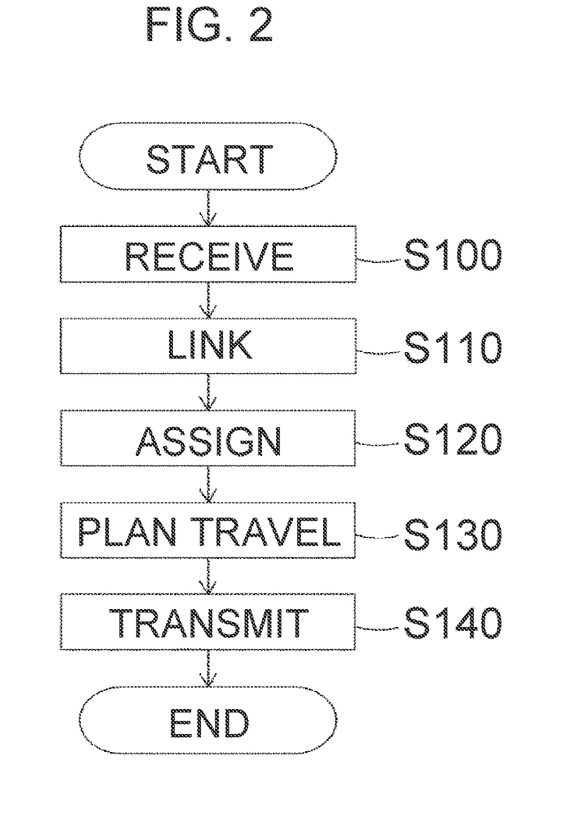
FIG. 2 is a control flow of a transport management apparatus.

FIG. 1 shows a functional block diagram of a transport system 1. As shown in FIG. 1, the transport system 1 includes a transport management apparatus 2 and a plurality of transport robots 3.

The transport management apparatus 2 is a specific example of a transport management system. The transport management apparatus 2 is implemented by a single apparatus. However, the transport management apparatus 2 may be implemented through distributed processing by a plurality of apparatuses. Each transport robot 3 is a specific example of a transport moving apparatus that can autonomously travel. In the present embodiment, as an example, the transport system 1 includes two transport robots 3.

The transport management apparatus 2 causes at least one of the transport robots 3 to carry out a plurality of transport tasks. The transport management apparatus 2 includes a central processing unit (CPU) 2a as a central processor, a readable and writable random access memory (RAM) 2b, and a read only memory (ROM) 2c. The CPU 2a reads and executes a control program stored in the ROM 2c, whereby the control program causes hardware such as the CPU 2a to function as a plurality of functional sections. The plurality of functional sections typically include a reception section 4, a linkage section 5, an assignment section 6, and a travel planning section 7.

The reception section 4 receives p transport task information pieces indicating transport tasks, each of which has a point of origin and a point of destination of the transport task. p is a natural number equal to or larger than two. The reception section 4 may receive the plurality of transport task information pieces via input means included in the transport management apparatus 2, or may receive the plurality of transport task information pieces via another apparatus. The reception section 4 stores the received plurality of transport task information pieces in the RAM 2b.

The linkage section 5 generates q linked-tasks information pieces by linking the p transport task information pieces. q is a natural number equal to or larger than one and smaller than p. A linked-tasks information piece may include only one transport task information piece in some cases.

The assignment section 6 assigns the q linked-tasks information pieces to q transport robots 3, respectively. The assignment section 6 is also a specific example of a current position information acquisition section.

The travel planning section 7 generates travel plan information used when each transport robot 3 carries out the assigned linked-tasks information piece. The travel plan information is information indicating a travel route and times of passage of a corresponding transport robot 3.

Each transport robot 3 is a robot that can autonomously travel and transports a transport-target object. Each transport robot 3 includes a central processing unit (CPU) 3a as a central processor, a readable and writable random access memory (RAM) 3b, and a read only memory (ROM) 3c. The CPU 3a reads and executes a control program stored in the ROM 3c, whereby the control program causes hardware such as the CPU 3a to function as a plurality of functional sections. The plurality of functional sections include a current position information acquisition section 10 and a travel control section 11.

The current position information acquisition section 10 acquires current position information on the transport robot 3, typically, by using a GPS module (not shown). Each transport robot 3 transmits the acquired current position information to the transport management apparatus 2.

The travel control section 11 controls travel of the transport robot 3, based on travel plan information received from the transport management apparatus 2.

Next, a control flow of the transport management apparatus 2 will be described with reference to FIGS. 2 to 12.

S100

Figure 3:
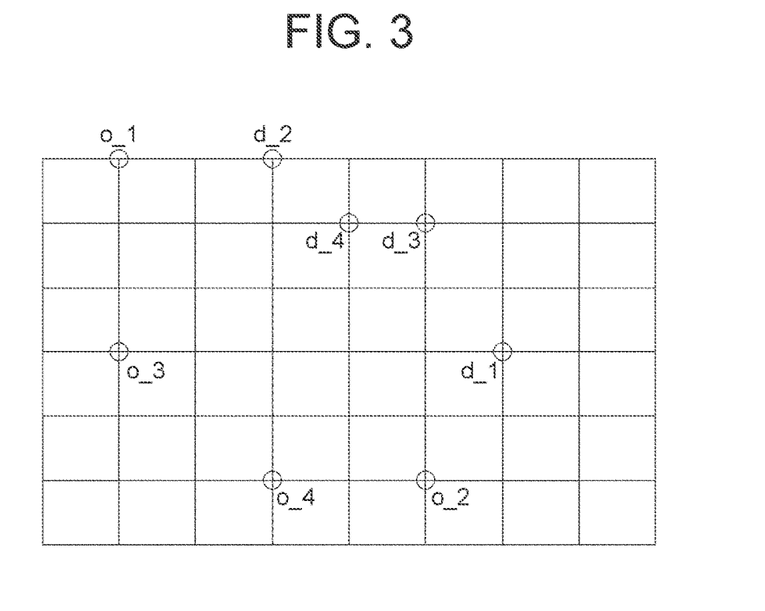
FIG. 3 shows transport tasks.

First, the reception section 4 of the transport management apparatus 2 receives p transport task information pieces. Here, see FIG. 3. FIG. 3 shows transport tasks 1, 2, 3, 4. As an example, the reception section 4 of the transport management apparatus 2 receives four transport task information pieces on the transport tasks 1 to 4.

The transport task 1 is a task of transporting a transport-target object from a point of origin o_1 to a point of destination d_1.

The transport task 2 is a task of transporting a transport-target object from a point of origin o_2 to a point of destination d_2.

The transport task 3 is a task of transporting a transport-target object from a point of origin o_3 to a point of destination d_3.

The transport task 4 is a task of transporting a transport-target object from a point of origin o_4 to a point of destination d_4.

Each side of each square of a grid shown in FIG. 3 represents a unit distance. The unit distance is, as an example, 50 meters. Accordingly, for example, the shortest distance between the point of origin o_1 and the point of destination d_2 is two, and the shortest distance between the point of origin o_1 and the point of destination d_1 is eight.

S110

The linkage section 5 of the transport management apparatus 2 generates two linked-tasks information pieces by linking the four transport task information pieces. In other words, the linkage section 5 generates two sets of linked tasks by linking the four transport tasks. In the present embodiment, since the plurality of transport tasks are assigned to the two transport robots 3, the linkage section 5 generates two sets of linked tasks by linking the four transport tasks. The linkage section 5 generates the two sets of linked tasks such that a total travel distance, which is the sum of travel distances of the two transport robots 3 required for the two transport robots 3 to carry out the two sets of linked tasks, respectively, becomes shortest. The term "travel distance" here means a distance over which each transport robot 3 travels from the point of origin of the beginning transport task, of the assigned linked tasks, to the point of destination of the last transport task.

First, the linkage section 5 calculates an inter-task travel distance made when two different transport tasks of the four transport tasks are linked in a sequence, and preferentially links two transport tasks that makes the shortest inter-task travel distance.

In other words, the linkage section 5 calculates the inter-task travel distance between a point of origin $o\_i$ of a transport task i and a point of destination $d\_j$ of a transport task j ($j \neq i$), and calculates the smallest values of the inter-task travel distances as per following expressions (1) to (4). Note that in the expressions (1) to (4), "dis(a, b)" means the shortest distance between a point "a" and a set "b". Accordingly, for example, as per the expression (1), the linkage section 5 calculates the inter-task travel distance between the point of origin $o\_1$ and the point of destination $d\_2$, calculates the inter-task travel distance between the point of origin $o\_1$ and the point of destination $d\_3$, calculates the inter-task travel distance between the point of origin $o\_1$ and the point of destination $d\_4$, and thus calculates that the smallest value of the inter-task travel distances is two.

$$dis(o\_1,\{d\_2,d\_3,d\_4\})=2 \quad (1)$$

$$dis(o\_2,\{d\_1,d\_3,d\_4\})=3 \quad (2)$$

$$dis(o\_3,\{d\_1,d\_2,d\_4\})=5 \quad (3)$$

$$dis(o\_4,\{d\_1,d\_2,d\_3\})=5 \quad (4)$$

According to the expression (1), a point of destination that is closest to the point of origin $o\_1$ is the point of destination $d\_2$.

According to the expression (2), a point of destination that is closest to the point of origin $o\_2$ is the point of destination $d\_1$.

According to the expression (3), points of destination that are closest to the point of origin $o\_3$ are the points of destination $d\_1$, $d\_2$, $d\_4$.

According to the expression (4), points of destination that are closest to the point of origin $o\_4$ are the points of destination $d\_1$, $d\_2$.

According to the expressions (1) to (4), the smallest value of the inter-task travel distances is two in the expression (1), and such an inter-task travel distance is implemented by linking the transport tasks 2 and 1 in this order. Accordingly, the linkage section 5 gives priority to linking the transport tasks 2 and 1 in this order, over other linkages. Hereinafter, linked tasks obtained by linking the transport tasks 2 and 1 in this order will be represented as "linked tasks 2→1". In other words, the linkage section 5 generates the linked tasks 2→1 by linking the transport tasks 2 and 1 in this order.

According to the expression (2), it is proposed to link the transport tasks 1 and 2 in this order. However, linked tasks obtained by linking the transport tasks 1 and 2 in this order are exclusive with respect to the linked tasks 2→1. Accordingly, the linkage section 5 does not generate the linked tasks obtained by linking the transport tasks 1 and 2 in this order.

According to the expression (3), it is proposed to: (a) link the transport tasks 1 and 3 in this order; (b) link the transport tasks 2 and 3 in this order; and (c) link the transport tasks 4 and 3 in this order.

(a) Linking the transport tasks 1 and 3 in this order is nothing less than linking the linked tasks 2→1 and the transport task 3 in this order. An inter-task travel distance is five when the transport tasks 1 and 3 are linked in this order. The linkage section 5 compares the inter-task travel distance with a predetermined value, and does not link the linked tasks 2→1 and the transport task 3 when the inter-task travel distance is not equal to or smaller than the predetermined value. Here, the predetermined value is, typically, two. Since the inter-task travel distance is not equal to or smaller than two, the linkage section 5 does not link the linked tasks 2→1 and the transport task 3 in this order.

A configuration is made such that linked tasks and another transport task are linked only when an inter-task travel distance is equal to or smaller than the predetermined value as described above, whereby it is possible to prevent all transport tasks from being linked into a single sequence. Note that when there are n transport tasks, the inter-task travel distances between points of origin and points of destination under consideration for linkage may be arranged in descending order, and a k-th value may be used for the predetermined value. Moreover, a distance required to link first to (k−1)-th transport tasks between a point of origin and a point of destination may be set to L or less, and a distance required to link a k-th and subsequent transport tasks may be set to M (M>L) or less.

(b) Linking the transport tasks 2 and 3 in this order is exclusive with respect to the linked tasks 2→1 that are preferentially adopted. Accordingly, the linkage section 5 does not link the transport tasks 2 and 3 is this order.

(c) The linkage section 5 links the transport tasks 4 and 3 in this order. Hereinafter, linked tasks obtained by linking the transport tasks 4 and 3 in this order will be represented as "linked tasks 4→3".

According to the expression (4), it is proposed to: (a) link the transport tasks 1 and 4 in this order; and (b) link the transport tasks 2 and 4 in this order.

(a) Linking the transport tasks 1 and 4 in this order is nothing less than linking the linked tasks 2→1 and the transport task 4 in this order. An inter-task travel distance is five when the transport tasks 1 and 4 are linked in this order. Accordingly, since the inter-task travel distance is not equal to or smaller than two, the linkage section 5 does not link the linked tasks 2→1 and the transport task 4 in this order.

(b) Linking the transport tasks 2 and 4 in this order is exclusive with respect to the linked tasks 2→1 that are preferentially adopted. Accordingly, the linkage section 5 does not link the transport tasks 2 and 4 in this order.

As a result, the linkage section 5 links the transport tasks 1 to 4 to generate the linked tasks 2→1 and the linked tasks 4→3.

If the transport tasks 1 to 4 are carried out by one transport robot 3, the linkage section 5 further links the linked tasks 2→1 and the linked tasks 4→3. In such a case, when the linked tasks 2→1 and the linked tasks 4→3 are linked in this order, an inter-task travel distance is five, which is the distance between the point of destination $d\_1$ and the point of origin $o\_4$. On the other hand, when the linked tasks 4→3 and the linked tasks 2→1 are linked in this order, an inter-task travel distance is four, which is the distance between the point of destination $d\_3$ and the point of origin $o\_2$. Accordingly, the linkage section 5 links the linked tasks 4→3 and the linked tasks 2→1 in this order such that a travel distance of the transport robot 3 becomes shortest, and generates linked tasks 4→3→2→1.

S120

Next, the assignment section 6 assigns the linked tasks 2→1 and the linked tasks 4→3 to the two transport robots 3, respectively. Specifically, the assignment section 6 receives and acquires current position information from the two transport robots 3. The assignment section 6 then assigns the linked tasks 2→1 and the linked tasks 4→3 to the two transport robots 3, respectively, based on the point of origin o_2 of the transport task 2, which is the beginning one of the linked tasks 2→1, the point of origin o_4 of the transport task 4, which is the beginning one of the linked tasks 4→3, and the respective current positions of the two transport robots 3.

Here, for convenience of the description, the two transport robots 3 will be referred to as "transport robot 3A" and "transport robot 3B". First, the assignment section 6 calculates the sum value of the distance between the transport robot 3A and the point of origin o_2 and the distance between the transport robot 3B and the point of origin o_4, and the sum value of the distance between the transport robot 3A and the point of origin o_4 and the distance between the transport robot 3B and the point of origin o_2, and compares the two sum values. The assignment section 6 then assigns the linked tasks 2→1 and the linked tasks 4→3 to the two transport robots 3, respectively, based on a result of the comparison. In other words, the assignment section 6 assigns the linked tasks 2→1 and the linked tasks 4→3 to the two transport robots 3, respectively, such that the sum of travel distances required before each transport robot 3 starts carrying out the assigned linked tasks becomes shortest.

S130

Subsequently, the travel planning section 7 generates travel plan information used when each transport robot 3 carries out the assigned linked tasks.

S140

The transport management apparatus 2 transmits the travel plan information generated by the travel planning section 7 to each transport robot 3. The travel control section 11 of each transport robot 3 carries out the assigned linked task information, based on the received travel plan information.

Next, a description will be given of a case in which the reception section 4 receives a new transport task while the two transport robots 3 are carrying out the two sets of linked tasks, respectively. In such a case, the linkage section 5 generates two sets of linked tasks by relinking anew transport tasks yet to be carried out. Then, when the two transport robots 3 complete respective transport tasks currently carried out, the assignment section 6 assigns the two sets of linked tasks that are relinked anew to the two transport robots 3, respectively. A process of relinking anew the transport tasks yet to be carried out is totally similar to the process described above. Hereinafter, cases in which a transport task new is added will be described based on FIG. 4.

Figure 4:
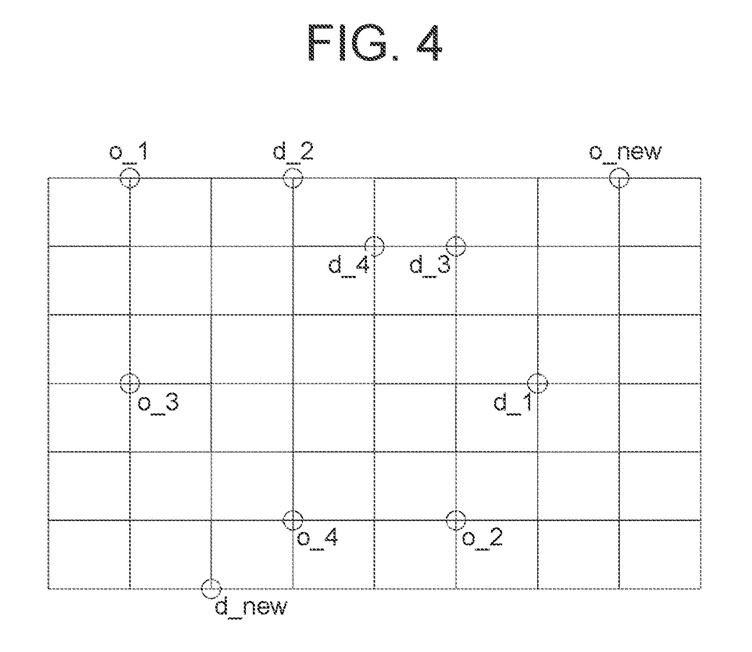
FIG. 4 shows transport tasks.

First, the linkage section 5 calculates an inter-task travel distance made when two different transport tasks of five transport tasks are linked in a sequence, and preferentially links two transport tasks that make the shortest inter-task travel distance.

In other words, the linkage section 5 calculates the inter-task travel distance between a point of origin o_i of a transport task i and a point of destination d_j of a transport task j (j≠i), and calculates the smallest values of the inter-task travel distances as per following expressions (1) to (5). For example, as per the expression (1), the linkage section 5 calculates the inter-task travel distance between the point of origin o_1 and the point of destination d_2, calculates the inter-task travel distance between the point of origin o_1 and the point of destination d_3, calculates the inter-task travel distance between the point of origin o_1 and the point of destination d_4, calculates the inter-task travel distance between the point of origin o_1 and a point of destination d_new, and thus calculates that the smallest value of the inter-task travel distances is two.

$$\operatorname{dis}(o\_1,\{d\_2,d\_3,d\_4d\_\text{new}\})=2 \qquad (1)$$

$$\operatorname{dis}(o\_2,\{d\_1,d\_3,d\_4d\_\text{new}\})=3 \qquad (2)$$

$$\operatorname{dis}(o\_3,\{d\_1,d\_2,d\_4d\_\text{new}\})=4 \qquad (3)$$

$$\operatorname{dis}(o\_4,\{d\_1,d\_2,d\_3d\_\text{new}\})=2 \qquad (4)$$

$$\operatorname{dis}(o\_\text{new},\{d\_1,d\_2,d\_3,d\_4\})=3 \qquad (5)$$

According to the expression (1), a point of destination that is closest to the point of origin o_1 is the point of destination d_2.

According to the expression (2), a point of destination that is closest to the point of origin o_2 is the point of destination d_1.

According to the expression (3), a point of destination that is closest to the point of origin o_3 is the point of destination d_new.

According to the expression (4), a point of destination that is closest to the point of origin o_4 is the point of destination d_new.

According to the expression (5), a point of destination that is closest to a point of origin o_new is the point of destination d_3.

According to the expressions (1) to (5), the smallest value of the inter-task travel distances is two in the expressions (1) and (4), and such an inter-task travel distance is implemented by linking the transport tasks 2 and 1 in this order, and linking the transport tasks new and 4 in this order. Moreover, such linkages are not mutually exclusive. Accordingly, the linkage section 5 gives priority to linking the transport tasks 2 and 1 in this order and linking the transport tasks new and 4 in this other, over other linkages. Hereinafter, linked tasks obtained by linking the transport tasks 2 and 1 in this order will be represented as "linked tasks 2→1". Linked tasks obtained by linking the transport tasks new and 4 in this order will be represented as "linked tasks new→4".

According to the expression (2), it is proposed to link the transport tasks 1 and 2 in this order. However, linked tasks obtained by linking the transport tasks 1 and 2 in this order are exclusive with respect to the linked tasks 2→1. Accordingly, the linkage section 5 does not link the transport tasks 1 and 2 in this order.

According to the expression (3), it is proposed to link the transport tasks new and 3 in this order. However, linked tasks obtained by linking the transport tasks new and 3 in this order are exclusive with respect to the linked tasks new→4. Accordingly, the linkage section 5 does not link the transport tasks new and 3 in this order.

According to the expression (5), it is proposed to link the transport tasks 3 and new in this order. Moreover, linked tasks obtained by linking the transport tasks 3 and new in this order are not exclusive with respect to the linked tasks 2→1 or the linked tasks new→4. Accordingly, the linkage section 5 links the transport task 3 and the linked tasks new→4 in this order. Hereinafter, linked tasks obtained by linking the transport task 3 and the linked tasks new→4 in this order will be represented as "linked tasks 3→new→4".

Thereafter, the assignment section 6 assigns the linked tasks 2→1 and the linked tasks 3→new→4 to the two transport robots 3, respectively.

Figure 5:
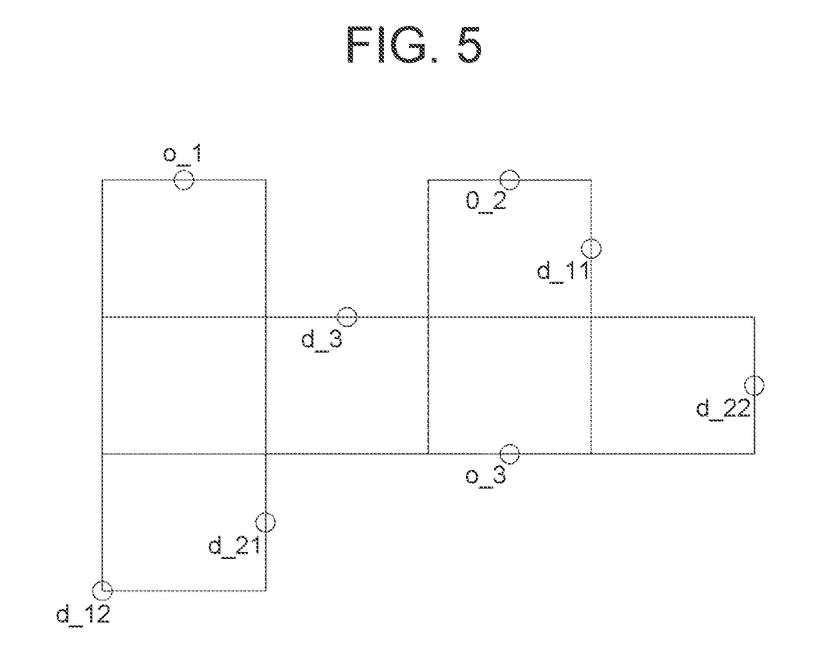
FIG. 5 shows transport tasks.

Next, a description will be given of a case in which some transport tasks have the same points of origin, with reference to FIG. 5. FIG. 5 shows transport tasks 11, 12, 21, 22, 3.

The transport task 11 is a task of transporting a transport-target object from a point of origin o_1 to a point of destination d_11.

The transport task 12 is a task of transporting a transport-target object from the point of origin o_1 to a point of destination d_12.

The transport task 21 is a task of transporting a transport-target object from a point of origin o_2 to a point of destination d_21.

The transport task 22 is a task of transporting a transport-target object from the point of origin o_2 to a point of destination d_22.

The transport task 3 is a task of transporting a transport-target object from a point of origin o_3 to a point of destination d_3.

Each side of each square of a grid shown in FIG. 5 represents twice a unit distance. The unit distance is, as an example, 50 meters. Accordingly, for example, the shortest distance between the point of origin o_1 and the point of destination d_3 is four, and the shortest distance between the point of origin o_1 and the point of destination d_12 is seven.

A method of linking a plurality of transport tasks by the linkage section 5 is similar to the method described above, also in the example shown in FIG. 5.

First, the linkage section 5 calculates an inter-task travel distance made when two different transport tasks of the five transport tasks are linked in a sequence, and preferentially links two transport tasks that make the shortest inter-task travel distance.

In other words, the linkage section 5 calculates the inter-task travel distance between a point of origin o_i of a transport task i and a point of destination d_j of a transport task j (j≠i), and calculates the smallest values of the inter-task travel distances as per following expressions (1) to (3).

$$dis(o\_1, \{d\_21, d\_22, d\_3\}) = 4 \quad (1)$$

$$dis(o\_2, \{d\_11, d\_12, d\_3\}) = 2 \quad (2)$$

$$dis(o\_3, \{d\_11, d\_12, d\_21, d\_22\}) = 4 \quad (3)$$

According to the expression (1), a point of destination that is closest to the point of origin o_1 is the point of destination d_3.

According to the expression (2), a point of destination that is closest to the point of origin o_2 is the point of destination d_11.

According to the expression (3), points of destination that are closest to the point of origin o_3 are the points of destination d_11, d_21, d_22.

According to the expressions (1) to (3), the smallest value of the inter-task travel distances is two in the expression (2), and such an inter-task travel distance is implemented by linking the transport tasks 11 and 21 in this order, or linking the transport tasks 11 and 22 in this order. Accordingly, the linkage section 5 gives priority to linking the transport tasks 11 and 21 in this order, or linking the transport tasks 11 and 22 in this order, over other linkages. Hereinafter, linked tasks obtained by linking the transport tasks 11 and 21 in this order will be represented as "linked tasks 11→21". Linked tasks obtained by linking the transport tasks 11 and 22 in this order will be represented as "linked tasks 11→22".

According to the expression (1), it is proposed to link the transport tasks 3 and 11 in this order, and to link the transport tasks 3 and 12 in this order. Hereinafter, linked tasks obtained by linking the transport tasks 3 and 11 in this order will be represented as "linked tasks 3→11". Linked tasks obtained by linking the transport tasks 3 and 12 in this order will be represented as "linked tasks 3→12".

According to the expression (3), it is proposed to link the transport tasks 11 and 3 in this order, to link the transport tasks 21 and 3 in this order, and to link the transport tasks 22 and 3 in this order. However, linked tasks obtained by linking the transport tasks 11 and 3 in this order are exclusive with respect to liking the transport tasks 11 and 21 in this order, or linking the transport tasks 11 and 22 in this order. Accordingly, the linkage section 5 does not link the transport tasks 11 and 3 in this order. Hereinafter, linked tasks obtained by linking the transport tasks 21 and 3 in this order will be represented as "linked tasks 21→3". Linked tasks obtained by linking the transport tasks 22 and 3 in this order will be represented as "linked tasks 22→3".

In other words, according to the expressions (1) to (3), the linked tasks 11→21 and the linked tasks 11→22 are proposed as linked tasks that are preferentially adopted, and the linked tasks 3→11, the linked tasks 3→12, the linked tasks 21→3, and the linked tasks 22→3 are proposed as other candidates.

According to such proposals, for example, when the transport tasks 11, 12, 21, 22, 3 are assigned to three transport robots 3, following combinations of linked tasks are conceivable. Note that a number in parentheses indicates a travel distance required to carry out corresponding linked tasks.

(Case 1A)

$$\text{Linked tasks } 3 \rightarrow 12 \ (15), \text{ linked tasks } 11 \rightarrow 22 \ (16),$$
$$\text{linked tasks } 21 \quad (8)$$

(Case 1B)

$$\text{Linked tasks } 12 \ (7), \text{ linked tasks } 11 \rightarrow 22 \ (16), \text{ linked}$$
$$\text{tasks } 21 \rightarrow 3 \quad (16)$$

(Case 2A)

$$\text{Linked tasks } 3 \rightarrow 12 \ (15), \text{ linked tasks } 11 \rightarrow 21 \ (18),$$
$$\text{linked tasks } 22 \quad (6)$$

(Case 2B)

$$\text{Linked tasks } 12 \ (7), \text{ linked tasks } 11 \rightarrow 21 \ (18), \text{ linked}$$
$$\text{tasks } 22 \rightarrow 3 \quad (14)$$

(Case 3A)

$$\text{Linked tasks } 3 \rightarrow 11 \ (16), \text{ linked tasks } 11 \rightarrow 22 \ (16),$$
$$\text{linked tasks } 21 \quad (8)$$

(Case 3B)

$$\text{Linked tasks } 11 \ (8), \text{ linked tasks } 11 \rightarrow 22 \ (16), \text{ linked}$$
$$\text{tasks } 21 \rightarrow 3 \quad (16)$$

(Case 4A)

Linked tasks 3→11 (16), linked tasks 11→21 (18),
   linked tasks 22    (6)

(Case 4B)

Linked tasks 11 (8), linked tasks 11→21 (18), linked
   tasks 22→3    (14)

Note that the linked tasks 11 are linked tasks including only the transport task 11. The same applies to the linked tasks 12, 21, 22.

The linkage section 5 then generates three sets of linked tasks such that a total travel distance, which is the sum of travel distances of the three transport robots 3 required for the three transport robots 3 to carry out the three sets of linked tasks, respectively, becomes shorter. The total travel distance in each of the cases 1A, 1B, 2A, 2B is 39. The total travel distance in each of the cases 3A, 3B, 4A, 4B is 40. Accordingly, the linkage section 5 determines to follow any one of the cases 1A, 1B, 2A, 2B.

Moreover, the linkage section 5 links the five transport tasks such that differences among the travel distances of the three transport robots 3 required for the three transport robots 3 to carry out the three sets of linked tasks, respectively, become smaller. A distribution of the travel distances required to carry out the three sets of linked tasks belonging to the case 1A is 12.7. A distribution in the case 1B is 18. A distribution in the case 2A is 26. A distribution in the case 2B is 20.7. Accordingly, when the case 1A is adopted, the differences among the travel distances of the three transport robots 3 required for the three transport robots 3 to carry out the three sets of linked tasks, respectively, are smallest. Accordingly, the linkage section 5 links the five transport tasks according to the case 1A, and generates the three sets of linked tasks.

Thereafter, the assignment section 6 assigns the three sets of linked tasks to the three transport robots 3, respectively.

Note that linkage methods in a case of assigning the five transport tasks to two transport robots 3, and in a case of assigning the five transport tasks to one transport robot 3, adhere to the linkage method described above.

For example, when the five transport tasks are assigned to two transport robots 3, the linkage section 5 links the five transport tasks, with the total travel distance and the distribution taken into consideration, and generates linked tasks 11→21 and linked tasks 22→3→12.

For example, when the five transport tasks are assigned to one transport robot 3, the linkage section 5 links the five transport tasks, with the total travel distance taken into consideration, and generates linked tasks 11→22 3→11→21.

Next, operation of the travel planning section 7 will be described with reference to FIGS. 6 to 12. As described above, the travel planning section 7 generates travel plan information used when each transport robot 3 carries out assigned linked tasks.

Figure 6:
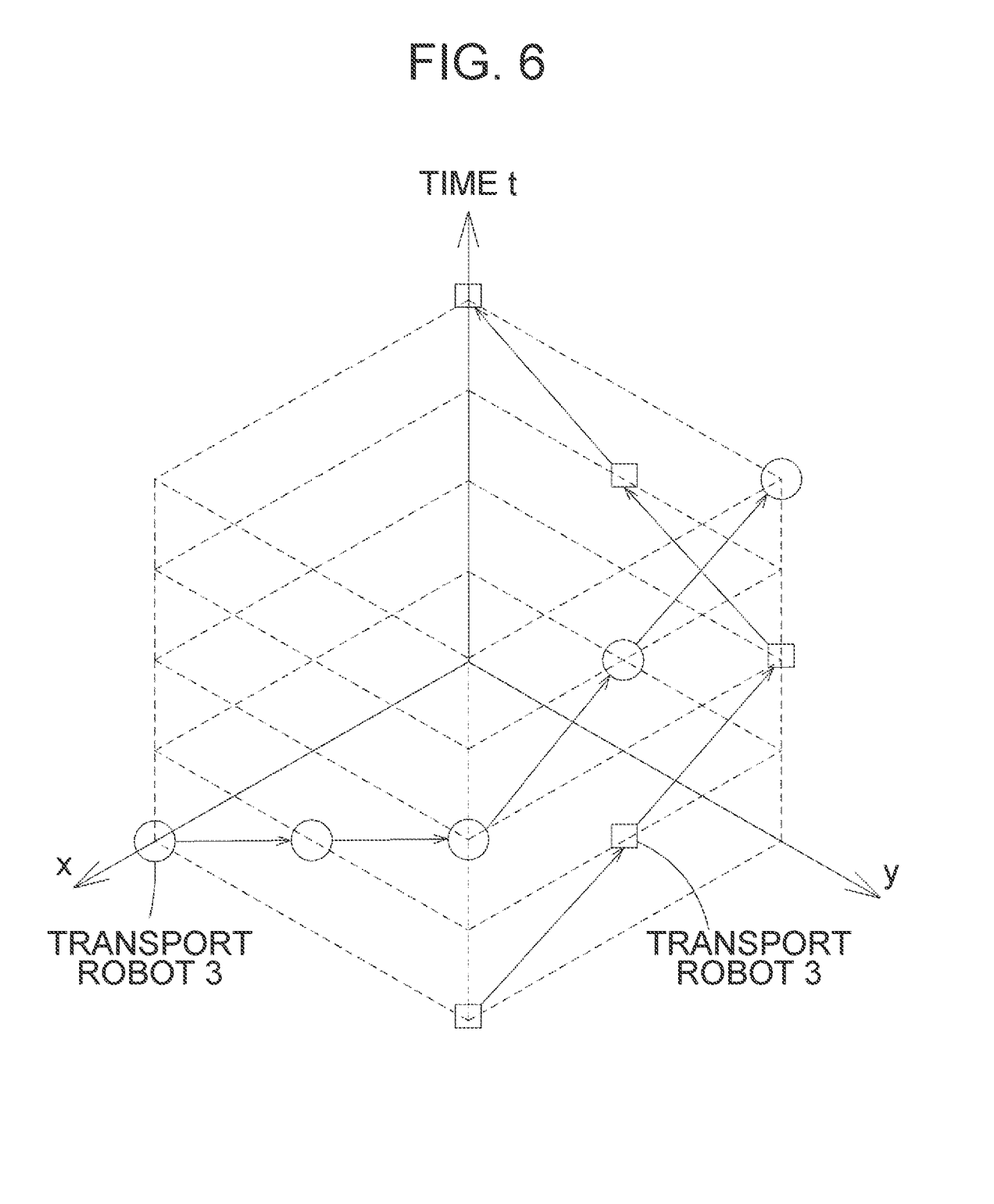
FIG. 6 is a conceptual diagram of travel plans for transport robots.

The travel planning section 7 searches for the shortest route that makes fewer changes of direction from a point of origin to a point of destination of each transport task. As shown in FIG. 6, the travel planning section 7 generates the travel plan information for each transport robot 3 such that the transport robots 3 do not collide with each other on the found shortest routes or routes obtained by making a local change to the shortest routes. The travel plan information is information indicating a travel route and times of passage of a corresponding transport robot 3. The travel route typically includes a plurality of nodes and links connecting the plurality of nodes. A time of passage is, typically, a time at which each node is passed.

Figure 7:
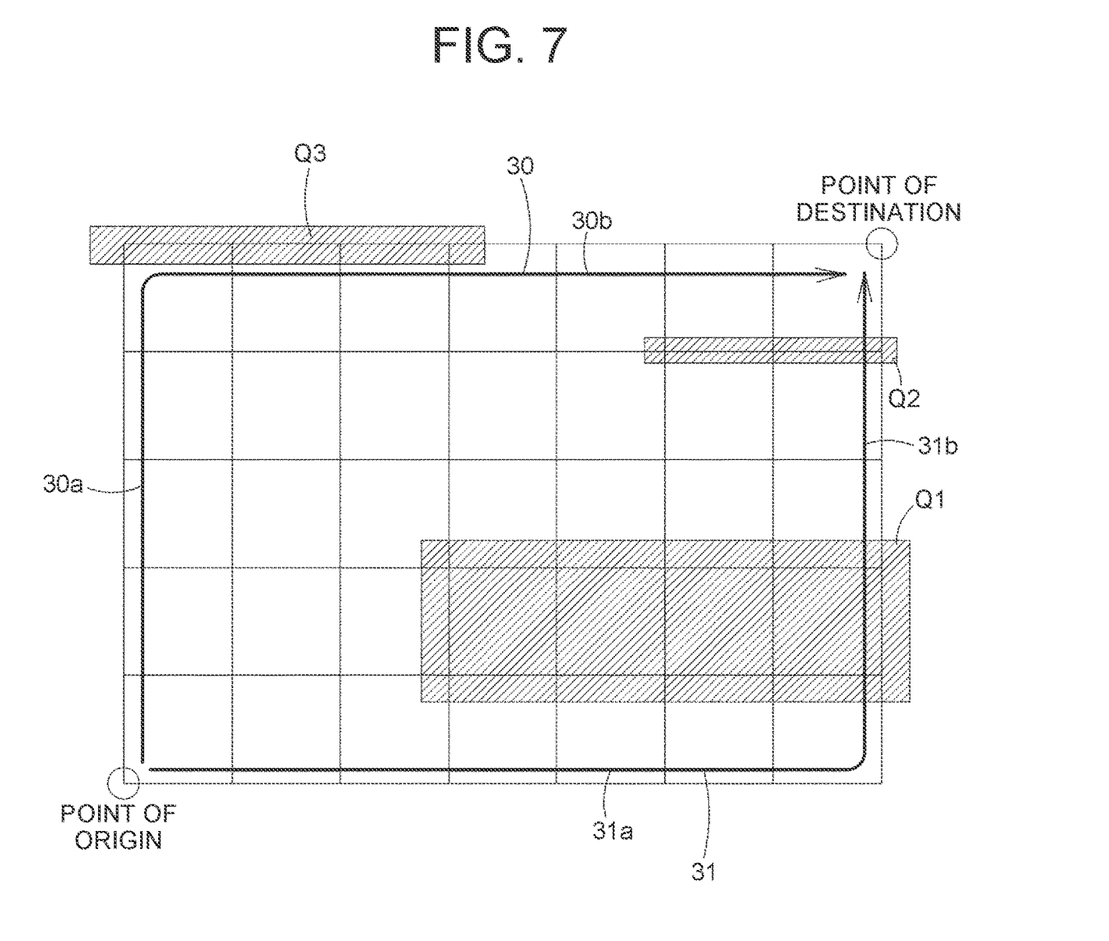
FIG. 7 is a diagram describing a method of searching for the shortest route of a transport robot.

Hereinafter, a description will be given of a method of creating the shortest route between a point of origin and a point of destination that makes fewer changes of direction, with reference to FIGS. 7 to 12. FIG. 7 shows a service environment in which a plurality of obstacles Q exist. In the service environment shown in FIG. 7, as an example, obstacles Q1, Q2, Q3 exist.

When creating the shortest route from a point of origin to a point of destination, the travel planning section 7 generates an upper L-shaped route 30 and a lower L-shaped route 31. The upper L-shaped route 30 is a route on which one right turn is made from the point of origin up to the point of destination. The upper L-shaped route 30 includes a first upper L-shaped route 30a vertically extending from the point of origin, and a lateral second upper L-shaped route 30b continuing from the first upper L-shaped route 30a up to the point of destination. The lower L-shaped route 31 is a route on which one left turn is made from the point of origin up to the point of destination. The lower L-shaped route 31 includes a first lower L-shaped route 31a laterally extending from the point of origin, and a vertical second lower L-shaped route 31b continuing from the first lower L-shaped route 31a up to the point of destination.

The travel planning section 7 determines whether or not the first lower L-shaped route 31a of the lower L-shaped route 31 is blocked by any of the plurality of obstacles Q, and searches for the shortest route based on the lower L-shaped route 31 when there is no block, and searches for the shortest route based on the upper L-shaped route 30 when there is a block. In the example in FIG. 7, the first lower L-shaped route 31a of the lower L-shaped route 31 is not blocked by any of the obstacles Q. Accordingly, the travel planning section 7 generates the shortest route, based on the lower L-shaped route 31.

Figure 8:
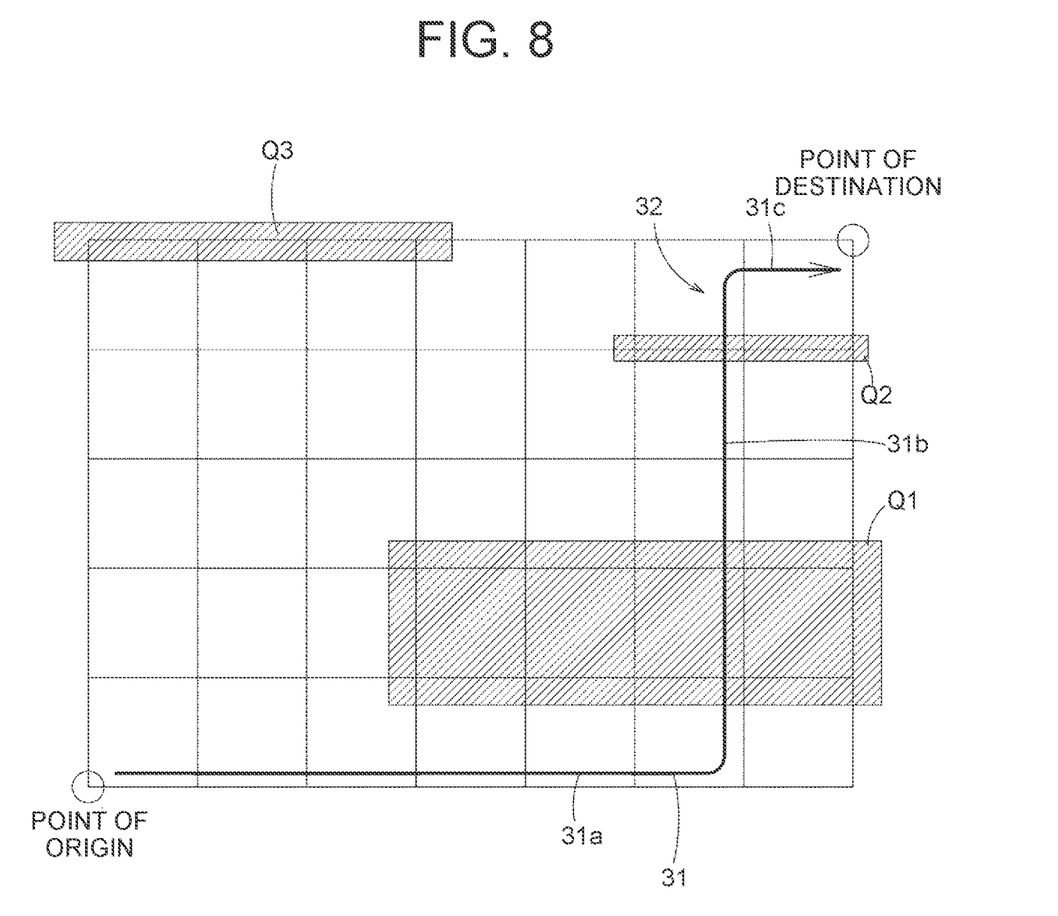
FIG. 8 is a diagram describing the method of searching for the shortest route of the transport robot.
Figure 9:
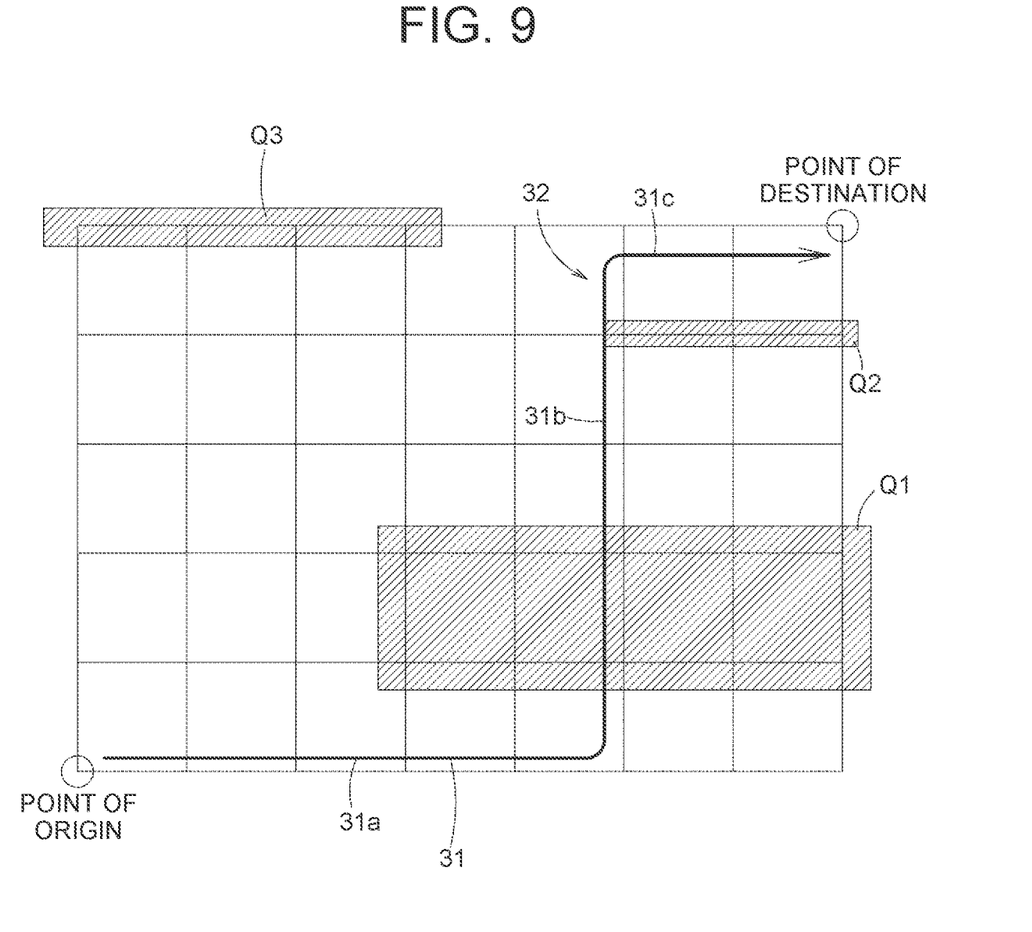
FIG. 9 is a diagram describing the method of searching for the shortest route of the transport robot.

Next, the travel planning section 7 determines whether or not the second lower L-shaped route 31b of the lower L-shaped route 31 is blocked by any of the plurality of obstacles Q. When there is a block, the travel planning section 7 parallel shifts the second lower L-shaped route 31b to a point-of-origin side by one square, and generates a partial upper L-shaped route including the second lower L-shaped route 31b and a lateral route continuing from the second lower L-shaped route 31b up to the point of destination. In the example in FIG. 7, the second lower L-shaped route 31b of the lower L-shaped route 31 is blocked by the obstacle Q1. Accordingly, as shown in FIGS. 8 and 9, the travel planning section 7 parallel shifts the second lower L-shaped route 31b to the point-of-origin side, and generates the partial upper L-shaped route 32 including the second lower L-shaped route 31b and the lateral route 31c continuing from the second lower L-shaped route 31b up to the point of destination.

Figure 10:
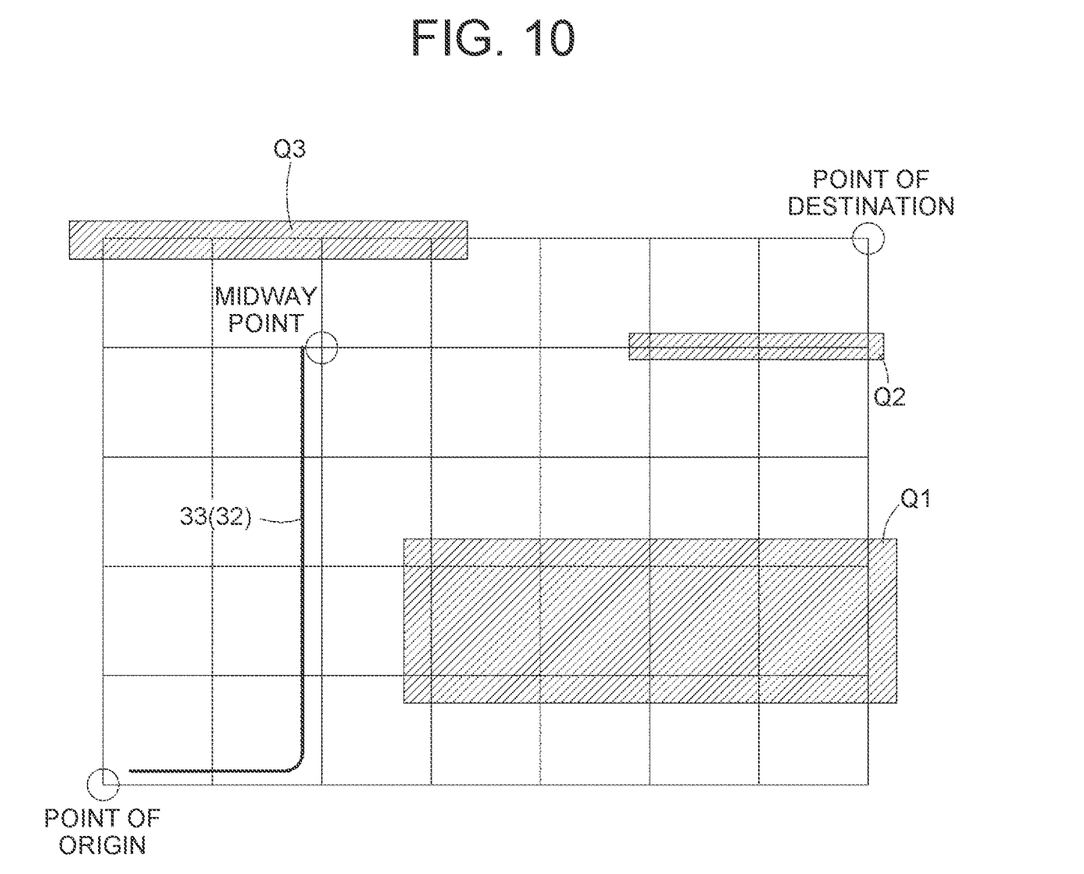
FIG. 10 is a diagram describing the method of searching for the shortest route of the transport robot.

By repeating the same processing, the travel planning section 7 acquires a passable route 33 as the partial upper L-shaped route 32 shown in FIG. 10.

Figure 11:
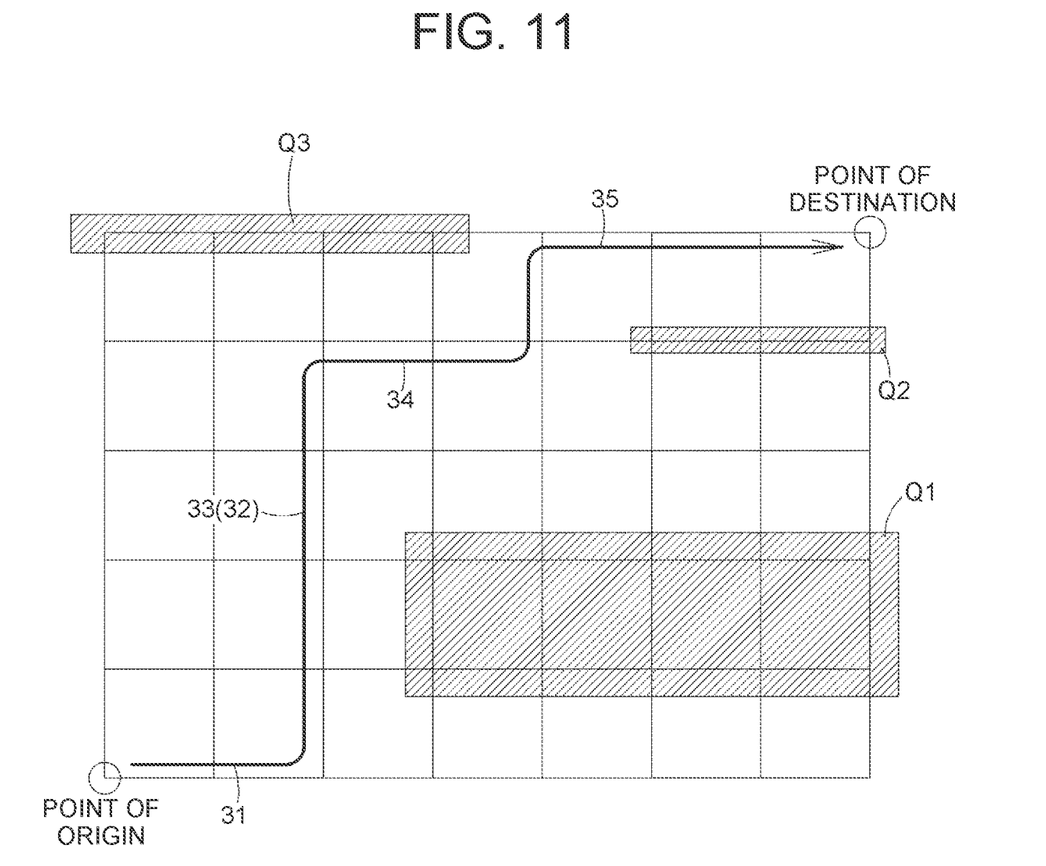
FIG. 11 is a diagram describing the method of searching for the shortest route of the transport robot.

Next, as shown in FIG. 11, the travel planning section 7 generates a partial lower L-shaped route 34 to generate a passable route. When a passable route based on a partial lower L-shaped route is not found, the travel planning section 7 further searches for a passable route based on a partial upper L-shaped route. In FIG. 11, the point of destination is reached by a partial upper L-shaped route 35. Thus, as the shortest route from the point of origin to the point of destination, the travel planning section 7 generates the shortest route including the lower L-shaped route 31, the partial upper L-shaped route 32, the partial lower L-shaped route 34, and the partial upper L-shaped route 35.

The travel planning section 7 generates the shortest route for each transport robot 3. In other words, for each transport robot 3, the travel planning section 7 generates the shortest route from the current position of the transport robot 3 to a point of origin of the beginning transport task of linked tasks assigned to the transport robot 3, and the shortest route from the point of origin of the beginning transport task of the linked tasks to a point of destination of the last transport task.

Here, it is assumed that each transport robot 3 travels one square per unit time along the shortest route, and that when a plurality of transport robots 3 pass the same place (node) at the same time, the travel planning section 7 gives priority to a transport robot 3 closer to the point of destination over the other transport robot 3, with the other transport robot 3 staying at the current position for one unit time. Thus, a transport robot 3 that has completed linked tasks and has time to spare can be secured sooner. When the plurality of transport robots 3 have the same distances to the respective points of destination, a transport robot 3 having traveled a longer distance from the point of origin is allowed to preferentially pass the node, over the other transport robot 3. When the plurality of transport robots 3 have the same distances to the respective points of destination, and when the plurality of transport robots 3 have also the same distances from the respective points of origin, the travel planning section 7 determines at random a transport robot 3 that preferentially passes the node.

Figure 12:
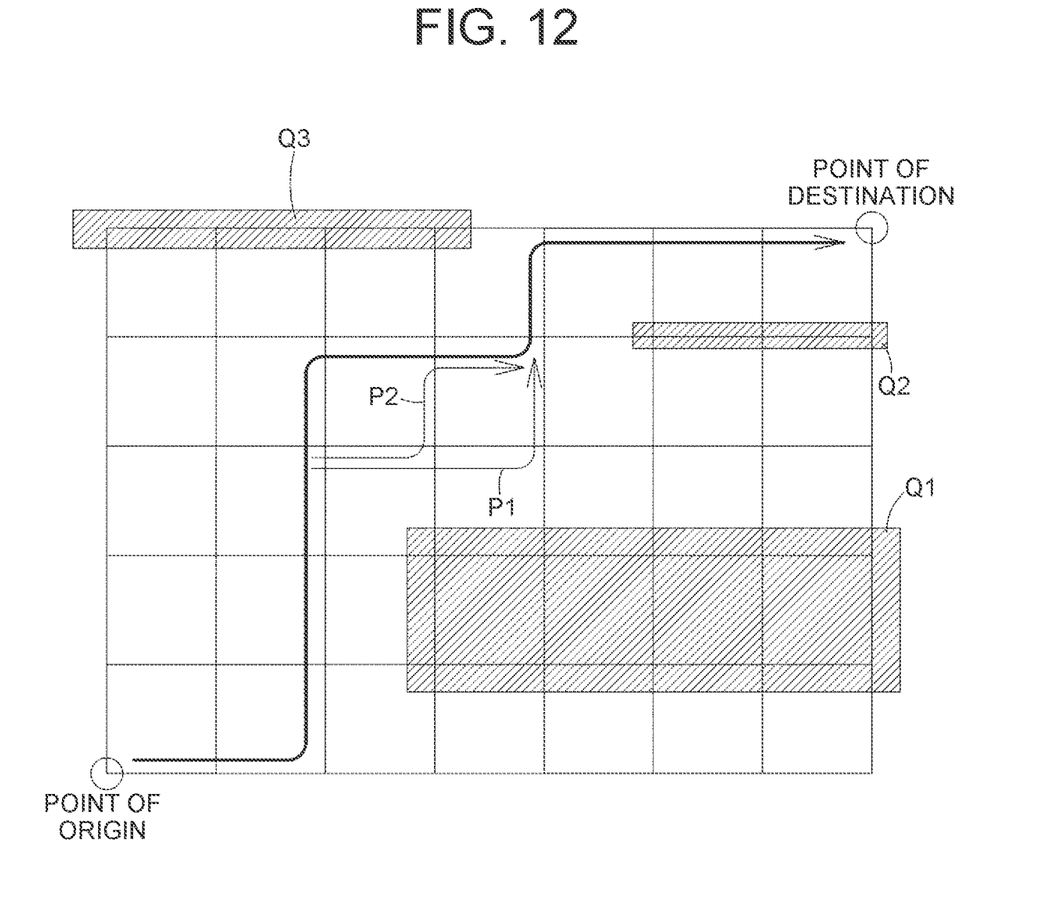
FIG. 12 is a diagram describing the method of searching for the shortest route of the transport robot.

Note that the travel planning section 7 can correct the shortest route such that a node and a link that are frequently used are not passed. In such a case, as shown in FIG. 12, by assuming that a corner of a partial L shape is a partial point of destination, the travel planning section 7 locally corrects the shortest route, such as by making a local route change P1 or a local route change P2.

Preferred embodiments of the disclosure of the present application have been described hereinabove, and the embodiments include characteristics as follows.

The transport management apparatus 2 (transport management system) includes: the reception section 4 that receives p transport task information pieces indicating transport tasks, each of which has a point of origin and a point of destination; the linkage section 5 that generates q (q<p) linked-tasks information pieces by linking the p transport task information pieces; and the assignment section 6 that assigns the q linked-tasks information pieces to q transport robots 3 (transport moving apparatuses), respectively. The linkage section 5 generates the q linked-tasks information pieces such that a total travel distance becomes shorter, the total travel distance being the sum of travel distances of the q transport robots 3, the travel distances being required for the q transport robots 3 to carry out the q linked-tasks information pieces, respectively. According to such a configuration, transport efficiency can be improved when a plurality of transport tasks are carried out.

The linkage section 5 calculates an inter-task travel distance made when two different transport task information pieces of the p transport task information pieces are linked in a sequence, and preferentially links two transport task information pieces that make the shortest inter-task travel distance. According to such a configuration, transport efficiency can be further improved when a plurality of transport tasks are carried out.

When an inter-task travel distance made when a linked-tasks information piece including at least two transport task information pieces is linked with another transport task information piece is not equal to or less than a predetermined value, the linkage section 5 does not link the linked-tasks information piece with the other transport task information piece. According to such a configuration, it is possible to prevent all transport task information pieces from being linked into a single linked-tasks information piece.

The transport management apparatus 2 further includes the assignment section 6 (current position information acquisition section) that acquires current position information on each of the q transport robots 3. The assignment section 6 assigns the q linked-tasks information pieces to the q transport robots 3, respectively, based on the point of origin of a beginning transport task information piece of each linked-tasks information piece, and a current position of each transport robot 3. Since each linked-tasks information piece can be assigned to a transport robot 3 that is closest to the point of origin of the beginning transport task information piece of the linked-tasks information piece, transport efficiency can be further improved.

When the reception section 4 receives a new transport task information piece while the q transport robots 3 are carrying out the q linked-tasks information pieces, respectively, the linkage section 5 generates q linked-tasks information pieces by relinking anew transport task information pieces yet to be carried out. When the q transport robots 3 complete respective transport task information pieces currently carried out, the assignment section 6 assigns the q linked-tasks information pieces that are relinked anew to the q transport robots 3, respectively. According to such a configuration, a newly received transport task information piece can be taken in without any difficulty.

The linkage section 5 links the p transport task information pieces such that a difference between the travel distances of the q transport robots 3 becomes smaller, the travel distances being required for the q transport robots 3 to carry out the q linked-tasks information pieces, respectively. According to such a configuration, unevenness of loads on the transport robots 3 can be restrained.

A transport management method includes: receiving p transport task information pieces indicating transport tasks, each of which has a point of origin and a point of destination; generating q (q<p) linked-tasks information pieces by linking the p transport task information pieces; and assigning the q linked-tasks information pieces to q transport robots 3, respectively. Generating the q linked-tasks information pieces is to generate the q linked-tasks information pieces such that a total travel distance becomes shorter, the total travel distance being the sum of travel distances of the q transport robots 3, the travel distances being required for the q transport robots 3 to carry out the q linked-tasks information pieces, respectively. According to such a method, transport efficiency can be improved when a plurality of transport tasks are carried out.

In the examples described above, a program can be provided to a computer by being stored in any of various types of non-transitory computer readable media. The non-transitory computer readable media include various types of tangible storage media. Examples of the non-transitory computer readable media include magnetic storage media (for example, flexible disk, magnetic tape, hard disk drive) and magneto-optical storage media (for example, magneto-optical disk). Examples of the non-transitory computer readable media further include CD read only memory (CD-ROM), CD-R, CD-R/W, and semiconductor memory (for example, including mask ROM; examples of the non-transitory computer readable media further including programmable ROM (PROM), erasable PROM (EPROM), flash ROM, and random access memory (RAM)). Moreover, the program may be provided to the computer by using any of various types of transitory computer readable media. Examples of the transitory computer readable media include an electric signal, an optical signal, and electromagnetic waves. The transitory computer readable media can provide the program to the computer through a wired communication channel over an electric line, fiber optic, or the like, or a wireless communication channel.

What is claimed is:

1. A transport management system comprising
one or more transport moving apparatuses, each transport moving apparatus of the one or more transport moving apparatuses including a first processor, a first memory, and a GPS module, the first processor being configured to acquire current position information of each respective transport moving apparatus via the GPS module, and
a transport management apparatus including a second processor and a second memory, the second processor being configured to:
receive one or more transport task information pieces indicating transport tasks, each transport task having a point of origin and a destination;
generate q(q<p) linked-tasks information pieces by linking the one or more transport task information pieces, where q is the number of linked-tasks information pieces, and p is the number of transport task information pieces;
assign the q(q<p) linked-tasks information pieces to q transport moving apparatuses of the transport moving apparatuses, respectively;
generate the q(q<p) linked-tasks information pieces to minimize a total travel distance, the total travel distance being a sum of travel distances of the q transport moving apparatuses, the travel distances being required for the q transport moving apparatuses to carry out the q(q<p) linked-tasks information pieces, respectively; and
assign each linked tasks information piece of the q(q<p) linked-tasks information pieces to a corresponding transport moving apparatus of the q transport moving apparatuses based on the point of origin of an initial transport task information piece of each of the q(q<p) linked-tasks information pieces, and a current position of each transport moving apparatus, wherein
each of the q(q<p) linked-tasks information pieces is assigned to the corresponding transport moving apparatus that is closest to the point of the origin of the initial transport task information piece,
the first processor is configured to send the current position information to the transport management apparatus,
the second processor is configured to receive the current position information from the q transport moving apparatuses,
the second processor is configured to, based on the current position information, generate travel plan information indicating a travel route and times of passage of the corresponding transport moving apparatus,
the second processor is configured to send the travel plan information and the q(q<p) linked-tasks information pieces to the q transport moving apparatuses,
the first processor is configured to receive the travel plan information and the q(q<p) linked-tasks information pieces from the transport management apparatus,
the first processor is configured to carry out the corresponding linked task information based on the travel plan information, and
the second processor is configured to link the p transport task information pieces such that a total difference between each of the travel distances of the q transport moving apparatuses is minimized, the travel distances being required for the q transport moving apparatuses to carry out the q(q<p) linked-tasks information pieces, respectively.

2. The transport management system according to claim 1, wherein the second processor is configured to calculate an inter-task travel distance made when two different transport task information pieces of the p transport task information pieces indicating travel distances for travel tasks are linked in a sequence, and preferentially links two transport task information pieces that make the shortest inter-task travel distance.

3. The transport management system according to claim 1, wherein when an inter-task travel distance made when a linked-tasks information piece including at least two transport task information pieces indicating travel distances for travel tasks is linked with another transport task information piece indicating a travel distance for a travel task is not equal to or less than a predetermined value, the second processor is configured not to link the linked-tasks information piece with the other transport task information piece.

4. The transport management system according to claim 1, wherein
when the second processor receives a new transport task information piece while the q transport moving apparatuses are carrying out tasks associated with the q(q<p) linked-tasks information pieces, respectively, the transport management apparatus is configured to generate q new linked-tasks information pieces by relinking the transport task information pieces that have not been carried out yet, and
when the q transport moving apparatuses complete the transport task information pieces currently being carried out, the transport management apparatus is configured to assign the new q linked-tasks information pieces to the q transport moving apparatuses, respectively.

5. A transport management method comprising:
by one or more transport moving apparatuses, acquiring current position information on the one or more transport moving apparatuses, each transport moving apparatus of the one or more transport moving apparatuses including a GPS module, the one or more transport moving apparatuses being configured to acquire the current position information of each respective transport moving apparatus via the GPS module;
by a transport management apparatus, receiving one or more task information pieces indicating transport tasks, each transport task having a point of origin and a destination;
by the transport management apparatus, generating q(q<p) linked-tasks information pieces by linking the one or more task information pieces, where q is the number of linked-tasks information pieces, and p is the number of transport task information pieces;

by the transport management apparatus, assigning the q(q<p) linked-tasks information pieces to q transport moving apparatuses of the transport moving apparatuses, respectively;

by the transport management apparatus, assigning each linked-tasks information piece of the q(q<p) linked-tasks information pieces to a corresponding transport moving apparatus of the q transport moving apparatuses based on the point of origin of an initial transport task information piece of each of the q(q<p) linked-tasks information pieces, and a current position of each transport moving apparatus;

by each of the q transport moving apparatuses, sending the current position information;

by the transport management apparatus, receiving the current position information from the q transport moving apparatuses;

by the transport management apparatus, based on the current position information, generating travel plan information indicating a travel route and times of passage of the corresponding transport moving apparatus;

by the transport management apparatus, sending the travel plan information and the q(q<p) linked-tasks information pieces to the q transport moving apparatuses;

by the q transport moving apparatuses, respectively receiving the travel plan information and the q(q<p) linked-tasks information pieces from the transport management apparatus;

by each of the q transport moving apparatuses, carrying out the corresponding linked task information based on the travel plan information; and by the transport management apparatus, linking the p transport task information pieces such that a total difference between each of the travel distances of the q transport moving apparatuses is minimized, the travel distances being required for the q transport moving apparatuses to carry out the q(q<p) linked-tasks information pieces, respectively, wherein each of the q(q<p) linked-tasks information pieces is assigned to the corresponding transport moving apparatus that is closest to the point of the origin of the initial transport task information piece, and the generating the q(q<p) linked-tasks information pieces is to generate the q(q<p) linked-tasks information pieces to minimize a total travel distance, the total travel distance being a sum of travel distances of the q transport moving apparatuses, the travel distances being required for the q transport moving apparatuses to carry out the q(q<p) linked-tasks information pieces, respectively.

6. A non-transitory storage medium storing instructions that are executable by one or more processors and that cause the one or more processors to perform the transport management method according to claim 5.

* * * * *